(No Model.)  2 Sheets—Sheet 1.

R. S. ELLIOTT.
LIVE BIRD TRAP.

No. 585,263.  Patented June 29, 1897.

Witnesses:
H. E. Price

Inventor:
R. S. Elliott
by Higdon & Higdon
Attys.

(No Model.) 2 Sheets—Sheet 2.
R. S. ELLIOTT.
LIVE BIRD TRAP.
No. 585,263. Patented June 29, 1897.
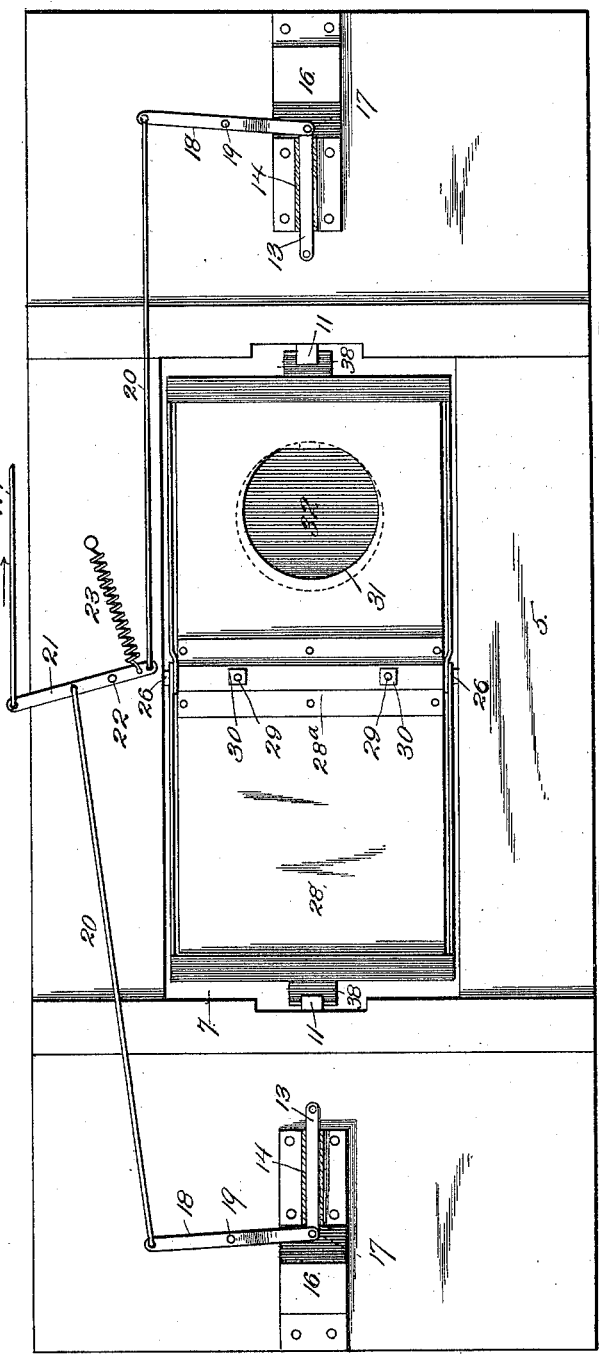
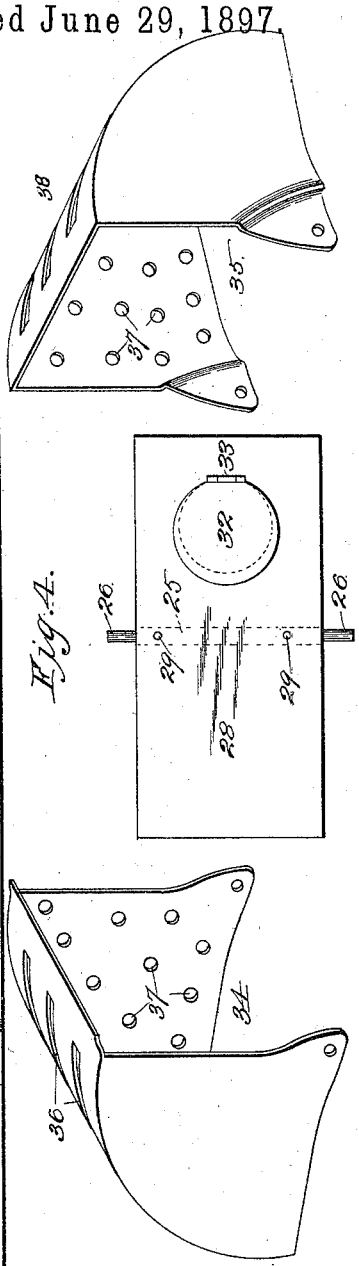
Witnesses:
H. E. Price
Inventor
R. S. Elliott
By Higdon & Higdon, Attys.

UNITED STATES PATENT OFFICE.

ROBERT S. ELLIOTT, OF KANSAS CITY, MISSOURI.

LIVE-BIRD TRAP.

SPECIFICATION forming part of Letters Patent No. 585,263, dated June 29, 1897.

Application filed March 28, 1896. Serial No. 585,256. (No model.)

*To all whom it may concern:*

Be it known that I, ROBERT S. ELLIOTT, of Kansas City, Jackson county, Missouri, have invented certain new and useful Improvements in Live-Bird Traps, of which the following is a full, clear, and exact description, reference being had to the accompanying drawings, forming a part hereof.

My invention relates to live-bird traps; and my object is to provide a trap which can be easily and quickly set by an attendant beneath it, who may also quickly and expeditiously, after resetting the trap, place a pigeon therein by way of an opening in the bottom or floor of the trap.

A further object of my invention is to produce a trap of the character indicated which is quick and positive in action and simple, strong, durable, and inexpensive of construction.

To these ends the invention consists in certain novel and peculiar features of construction and combinations of parts, as will be hereinafter described and claimed.

In order that the invention may be fully understood, I will proceed to describe it with reference to the accompanying drawings, wherein—

Figure 1:
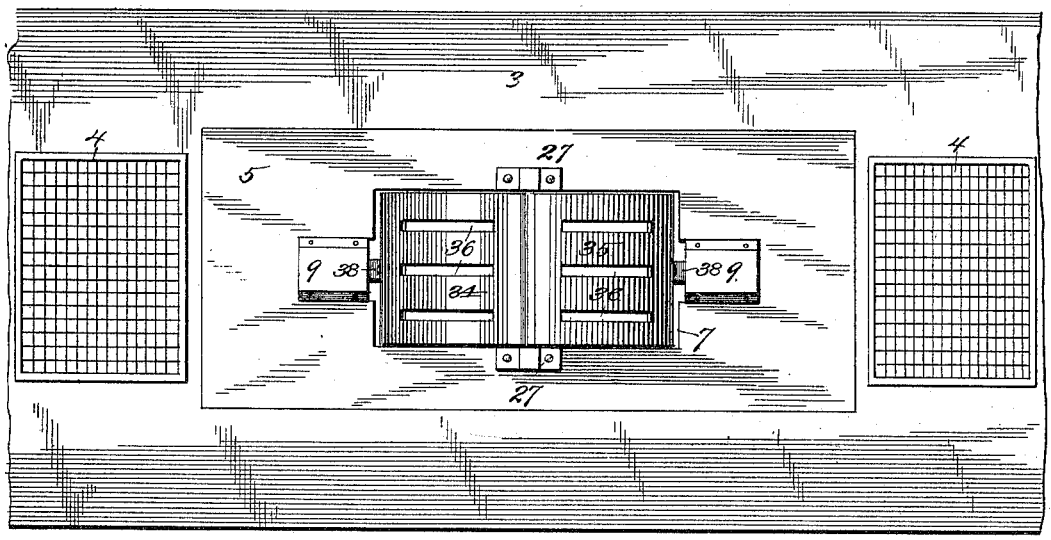
Figure 2:
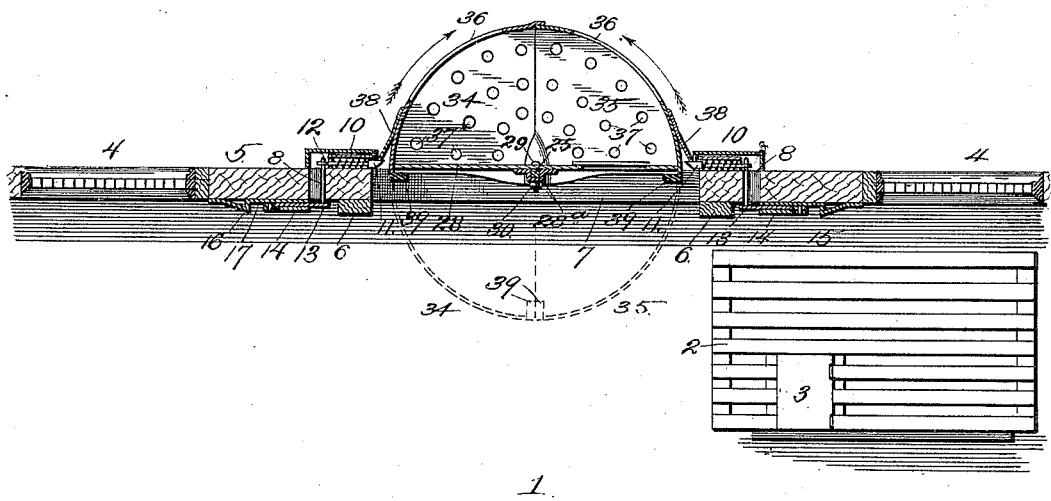

Figure 1 designates a plan view of a trap embodying my invention. Fig. 2 represents a vertical longitudinal section of the same and shows it in its proper operative position relative to the channel or ditch below wherein the pigeon-crate is temporarily stored and the trap-attendants remain while "shoot" is in progress. Fig. 3 represents an inverted plan view of the trap on a large scale. Fig. 4 represents detail views in perspective and plan, respectively, of a quadrant or rotatable covers of the trap and the horizontal bottom or floor of the same.

Before proceeding with a detail description of the invention it may be necessary to state that these traps are usually employed in series and are arranged at regular distances apart and equal distances from the point where the "shooter" stands, and all the traps are adapted to be sprung, one at a time, by an attendant to the rear of the shooter, or at any other convenient point where it is not possible for him to know which trap will be next sprung, which thereby increases the chances of the pigeon to get away unhurt.

With traps of my invention, which I term "bottom-feed" traps, there is no necessity for the boys who usually attend to resetting the traps getting in the way of the shooter, owing to the fact that I first provide a ditch or channel 1 of such length that it affords accommodation to each and all the series of traps employed, and located adjacent to each trap in said ditch or channel is a pigeon-crate 2, in which are placed the requisite number of pigeons. Said crates are provided with doors, which may be easily and quickly opened by one of the boys in the ditch in order to extricate a pigeon. Said ditch or channel is also covered by a platform 3 for its entire length, and said platform is provided with grates or windows at suitable points to afford sufficient light to the attendants in the ditch. Said platform is provided at proper intervals with openings wherein are placed the traps. As said traps are of precisely the same construction a description of one will suffice for all.

The trap is constructed as follows—that is to say: 5 designates a substantial base-board or frame which fits snugly within the opening in the platform 3 and rests upon cross-bars 6 or may be supported in any other suitable manner. It is provided with an elongated rectangular opening 7 and is provided centrally and at opposite ends of the opening 7 with short longitudinal slots 8, which open at their upper ends into the outer ends of the hoods or caps 9. Arranged longitudinally within said hoods or caps and upon the upper side of the board or frame 5 are the casings 10, within which are secured the longitudinal spring-actuated bolts 11, which are beveled at their under sides like an ordinary door-bolt and are advanced normally with a yielding pressure by their actuating-springs beyond the adjacent ends of the elongated opening 7 and also project beyond the corresponding ends of the caps or covers 10, which are designed chiefly as a protection to said spring-actuated bolts from inclement weather. The lower ends of said bolts are connected by the vertical rods 12, extending through the slots 8, to the inner ends of the sliding bars 13, arranged to reciprocate longitudinally within the guide-sleeves 14 at the under side of the base-board 5. In order to reduce the wear upon said base-board to a minimum, I preferably interpose between the same and said sliding bars wear-plates 15, and said wear-plates are provided with vertical shoulders 16, beyond the outer ends of the bars 13 and adapted to limit their downward movement. Said bars project outward beyond the guide-sleeves 14 and are pivotally connected, as at 17, to the similar levers 18, pivoted, as at 19, through their middle to the under side of the base-board 5, and said levers 18 at their opposite ends are pivotally connected by the pull-rods 20 to a lever 21, at the opposite sides of its point of pivotal connection 22 with the base-board. A spring 23, either of the retractile type shown or of any other suitable type and arrangement, is connected to said lever, so as to hold, through the medium of the connections hereinbefore described, the spring-actuated bolts 11 projected beyond the adjacent ends of the elongated opening 7, as shown. The outer end of the lever 21 is connected by a rod or flexible connection 24 with any suitable mechanism or means (not shown) for pivotally operating said lever in the direction indicated by the arrow, Fig. 3, and thereby retracting said bolt 11, for a purpose which will hereinafter appear.

The trap proper comprises a rectangular shaft 25, which extends transversely of the opening 7 and is provided with cylindrical ends 26, which are journaled in bearings 27, secured to the upper side of the base-board 5. The bottom or floor 28 of the trap, which is preferably of rectangular configuration, as shown, is secured upon said shaft by means of the bolts 29 and the transversely-extending clip 28ª, which embraces the under and opposite sides of the shaft and is riveted or otherwise suitably secured to the bottom or floor 28. In order to make this connection permanent and reliable in every respect, I employ nuts or taps 30, which are secured upon the lower ends of the bolts 29, and thus clamp the floor firmly down upon the shaft or axle. At one side of the shaft said floor is provided with a circular opening 31, and covering said opening, at the upper side of the floor, is a door or plate 32, which is hinged to said floor loosely, as at 33, that it may by gravity close the opening, and thus prevent the escape of the pigeon immediately the attendant's hand is withdrawn through the opening after placing the pigeon within the trap.

34 and 35 designate the quadrants, which are pivotally or loosely mounted upon the cylindrical ends 26 of the shaft, and they are provided in their peripheries with openings 36 to admit light, and in one side, if desired, with openings 37. The openings will, if provided, be in the side opposite from the shooter, so that the pigeon will be unable to see him or others in his vicinity. These quadrants are of sheet metal, and when the trap is closed by causing said quadrants to assume the position shown in full lines, Figs. 1 and 2, a semicircular chamber or trap is provided, and they are held in this position by means of the catch-plates 38, projecting outwardly from the peripheries of said quadrants near their lower ends and bearing upon the advanced bolts 11, as shown clearly in Figs. 2 and 3.

The trap, after being "set," as shown in Fig. 2, and after the pigeon has been placed therein, is sprung instantaneously by moving the lever 21 in the direction indicated by the arrow, Fig. 3, and thereby withdrawing the bolts 11 from beneath the catch-plates 38 of said quadrants, which therefore by gravity fall or swing instantly to the position shown in dotted lines, same figure, thereby leaving the floor or bottom plate entirely uncovered and the pigeon unprotected. The trap is no sooner sprung, however, than the pigeon, frightened or startled by the sudden opening made above him, rises from the trap. Therefore it is obvious that it will require considerable more quickness and skill of the shooter to kill a pigeon escaping from one of these traps than from an ordinary trap of this class now in use, owing to the fact that the escape of the pigeon is simultaneous with the opening of the trap, and he therefore obtains a lead of two yards or more over the shooter, more than he would obtain from a trap consisting of a single semicircular cover, which must roll or slide completely to one side before the bird is uncovered, as will be readily seen. As these quadrants descend with great swiftness, in order to cushion the impact or shock when they come together below the floor or bottom 38, to prevent injury and reduce the clatter or noise as much as possible, I secure to their lower ends the heavy strips 39, of rubber or equivalent material, which impinge against each other, as illustrated in dotted lines, Fig. 2, and thus prevent a direct contact of metal with metal or of any other material of which the quadrants may be constructed. After a trap is sprung the boy or attendant in the ditch or channel below, by pressing upwardly upon said compartments, swings them instantly back to their original position, so as to form the pigeon-receiving chamber, and they are sustained in such position by reason of the fact that during their upward passage the catch-plates 38 come in contact with the beveled under sides of the spring-actuated bolts 11 and repress or force them outwardly. Immediately said catch-plates clear the said bolts the latter are forced forwardly again by their actuating-springs below said plates and thereby support the quadrants in their operative position. The bird is then placed in the trap, and it is again ready for operation.

It is obvious, of course, that in place of actuating bolts 11 by springs, as shown, they may be rigid with respect to the upward movement of the catch-plates—that is, instead of said bolts being repressed by such upward movement the catch-plates may be made of spring metal, that they may yield inwardly as the quadrants are elevated and then spring outward and above said bolts after they reach a higher plane, in order to prevent the accidental or unintentional descent of the quadrants, as will be readily understood.

Thus it will be seen that I have produced what I term a "bottom-feed" trap which is positive, reliable, and exceedingly quick in freeing the pigeon.

It is obvious, of course, that changes in the form, proportion, and arrangement of parts and also in the means for springing the trap may be resorted to without departing from the spirit and scope or sacrificing any of the advantages of the invention, which essentially consists of a trap consisting of a floor or bottom provided with an opening to receive the pigeons from below, and downwardly and oppositely opening quadrants for uncovering or exposing the pigeon.

Having thus described the invention, what I claim as new, and desire to secure by Letters Patent, is—

1. A live-bird trap, comprising a base-board or platform arranged over the pit or channel and provided with an opening, a shaft or axle extending transversely of said opening, a floor or bottom mounted upon said shaft or axle and provided with a feed-opening and a pair of segment-shaped covers pivotally mounted upon said shaft or axle, in order that when the trap is opened said segment-shaped covers will open oppositely or away from each other and simultaneously swing below the floor or bottom in order that the pigeon may be entirely exposed.

2. A live-bird trap, comprising a base-board or platform arranged over a pit or channel and provided with an opening, a shaft or axle extending transversely of said opening, a floor or bottom mounted upon said shaft or axle and provided with a feed-opening, a hinged door or plate closing said opening, a pair of segment-shaped covers pivotally mounted upon said shaft or axle, in order that when the trap is opened said segment-shaped covers will open oppositely or away from each other and simultaneously swing below the frame or bottom in order that the pigeon may be entirely exposed.

3. A live-bird trap, comprising a suitable base-board or frame arranged above the pit or channel, a shaft extending transversely of an opening in said base-board, a trap mounted in said opening upon said shaft and consisting of a floor provided with a feed-opening, and two segment-shaped covers, which are pivotally mounted upon said shaft and form a semicircular chamber above said base-board when closed, catch-plates projecting peripherally outward and downward from said covers, bolts carried by said base-board projecting below said catch-plates, and means to withdraw said bolts, in order to permit said covers to swing downwardly and expose the upper side of the floor or bottom of the trap, substantially as described.

4. A live-bird trap comprising a base-board or frame mounted above a pit or channel, a shaft extending transversely of an opening in said base-board, a trap mounted thereon, and consisting of a floor or bottom provided with a feed-opening, and segmental covers, pivotally mounted upon said shaft, catch-plates projecting outwardly from said covers, and spring-actuated bolts projecting into the path of said catch-plates so that when the covers are elevated to their operative position so as to form a chamber above the floor or bottom, said bolts first yield to the upward movement of the catch-plates and then advance below the same and thereby support the covers in their closed or operative position.

5. A live-bird trap, comprising a base-board or frame mounted above a pit or channel, a shaft extending transversely of an opening in said base-board, a trap mounted thereon, and consisting of a floor or bottom provided with a feed-opening, and segmental covers pivotally mounted upon said shaft, catch-plates projecting outwardly from said covers, spring-actuated bolts projecting into the path of said catch-plates so that when the covers are elevated to their operative position so as to form a chamber above the floor or bottom, said bolts first yield to the upward movement of the catch-plates and then advance below the same and thereby support the covers in their closed or operative position, and the means for simultaneously retracting said spring-actuated bolts and thereby permitting said covers to descend by gravity and expose the upper side of the floor or bottom.

6. A live-bird trap, comprising a base-board or floor mounted above a pit or channel, a shaft extending transversely of an opening in said base-board, a trap mounted thereon, and consisting of a floor or bottom provided with a feed-opening and segmental covers, pivotally mounted upon said shaft, catch-plates projecting outwardly from said covers, spring-actuated bolts projecting into the path of said catch-plates so that when the covers are elevated to their operative position to form a chamber above the floor or bottom, said bolts first yield to the upward movement of the catch-plates and then advance below the same and thereby support the covers in their closed or operative position, sliding plates connected to said spring-actuated bolts, levers pivoted thereto, a third lever pivotally linked to said first-named levers, and a spring engaging said last-named lever, and normally holding the spring-actuated bolts advanced, substantially as and for the purpose set forth.

In testimony whereof I affix my signature in presence of two witnesses.

ROBERT S. ELLIOTT.

Witnesses:
G. Y. THORPE,
H. E. PRICE.